Aug. 25, 1936.　　　　R. H. SWART　　　　2,051,971
REFRIGERATING APPARATUS
Filed March 30, 1935
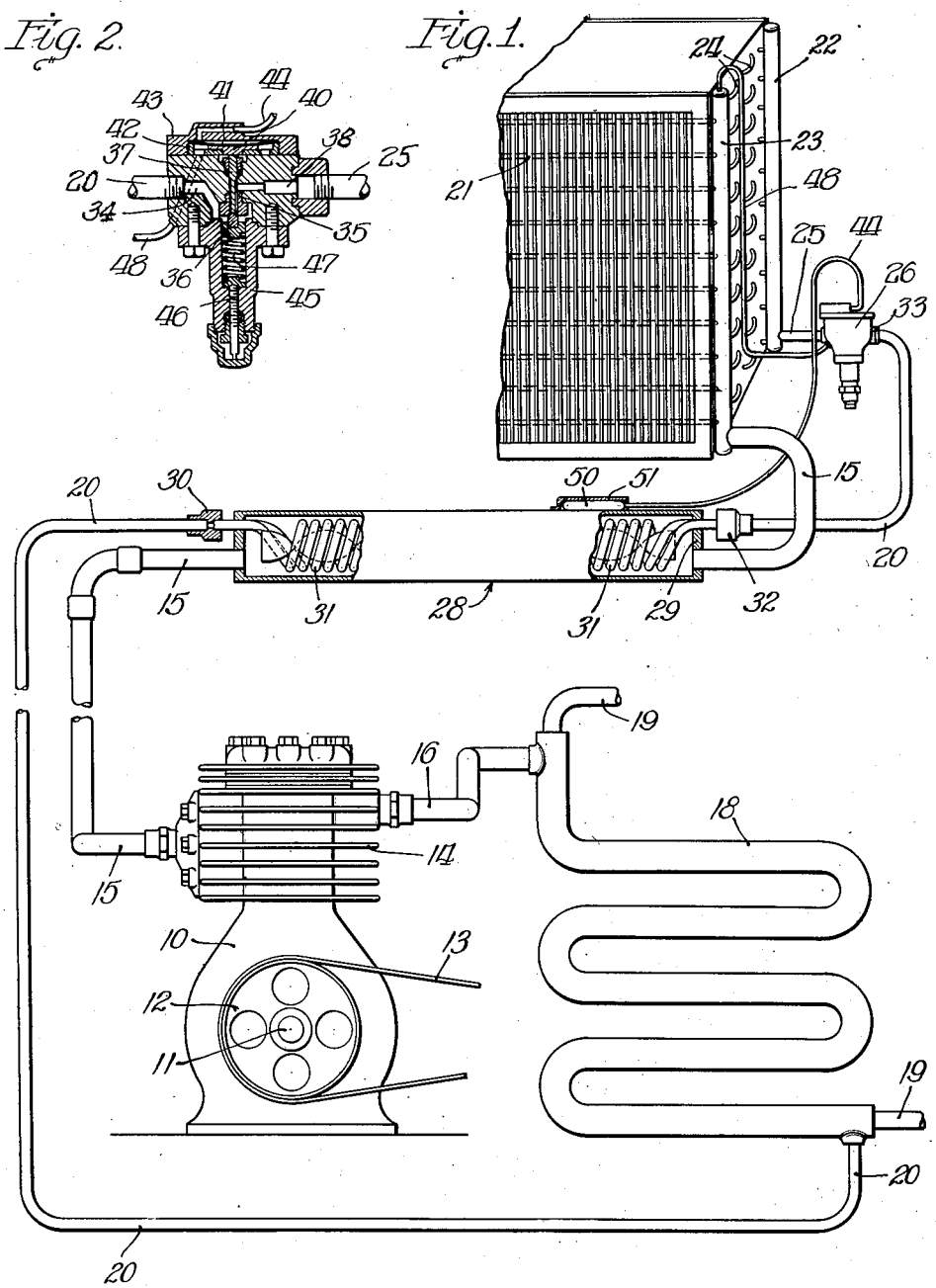
Inventor:
Richard H. Swart,
By: Wilkinson, Huxley, Byron & Knight
Attys.

Patented Aug. 25, 1936

2,051,971

UNITED STATES PATENT OFFICE 2,051,971

REFRIGERATING APPARATUS

Richard H. Swart, Beloit, Wis., assignor to General Refrigeration Corporation, Beloit, Wis., a corporation of Delaware Application March 30, 1935, Serial No. 13,871

7 Claims. (Cl. 62—8)

The invention relates to refrigerating apparatus and has reference more particularly to improvements in the automatic control for the expansion valve for rendering more uniform the flow of liquid refrigerant to the evaporator to secure more efficient operation thereof and maximum cooling capacity at all times.

In refrigerating systems equipped with a thermostatic expansion valve the liquid refrigerant is admitted to the evaporating coils through a valved opening which is closed and opened by variations in pressure produced by an expansible liquid contained within the thermostatic bulb connected with said expansion valve. The said liquid of the bulb exerts a pressure on an expansible member and moves the valve to open position when the same is sufficient to overcome the back pressure of the refrigerating medium in the evaporator.

It has been customary to locate the thermostatic bulb within the cooling chamber of the refrigerating apparatus either in contact with or adjacent to the evaporating coils or tray, but more recently said bulb has been located on the suction or return line of the evaporator. In either case the expansion valve is directly controlled in response to the temperature of the evaporator. However, the control has not been entirely successful as the action of the thermostatic bulb effects a closing of the expansion valve to an excessive extent, starving the evaporating coils for a short period of time until the said bulb has had an opportunity to warm up. Also the expansion valve has operated to feed excessive quantities of liquid during the period in which the bulb is cooling down. In other words, the action of the thermostatic bulb results in a considerable lag in the operation of the expansion valve which is undesirable since during a portion of the cycle excessive refrigerant is being returned from the suction line to the compressor and during another portion of the cycle the evaporator coils are being starved of liquid refrigerant and do not operate at their maximum efficiency.

An object of the invention is to provide improved control means for expansion valves that will eliminate overfeeding and underfeeding of the liquid refrigerant and which will supply just the proper quantity thereof to the evaporator at all times to produce the maximum cooling capacity for the particular conditions of operation.

According to the invention the thermostatic bulb of the expansion valve is located in contact with a heat interchanger which functions to precool the liquid refrigerant before delivering the same to the expansion valve, the liquid refrigerant being cooled by bringing the same into heat exchanging relationship with the suction line of the evaporator containing the cooled evaporated refrigerant. The change in temperature of the shell of the heat interchanger is rapid as the same is influenced by the cooled refrigerant gas and also by the high temperature liquid refrigerant and this rapid rate of temperature change, which in turn affects the thermostatic bulb, results in a more uniform flow of refrigerant through the expansion valve.

With these and various other objects in view, the invention may consist of certain novel features of construction and operation, as will be more fully described and particularly pointed out in the specification, drawing and claims appended hereto.

In the drawing which illustrates an embodiment of the invention and wherein like reference characters are used to designate like parts—

Figure 1 is a diagrammatic view showing a conventional refrigerating system equipped with the improved control means of the invention for regulating the thermostatic expansion valve; and Figure 2 is a sectional view showing details of the thermostatic expansion valve that has been selected for illustration.

The refrigerating system shown in the drawing consists of a compressor 10 of the usual type having an operating shaft 11 to which is secured pulley 12, driven through belt 13 by an electric motor or any other suitable source of power, not shown, to cause rotation of the operating shaft 11. The pressure head of the compressor is formed with a plurality of fins 14 providing cooling surfaces for the pressure head which is supplied with evaporated refrigerant by the suction line 15 connecting therewith at the base. The evaporated refrigerant is compressed as the compressor is driven, the temperature and pressure of the same being thereby raised, and which is then delivered to the compressor discharge line 16.

The refrigerant gas from compressor discharge line 16 enters a condenser designated in its entirety by 18, which consists of a continuous coil having an interior tube 19 extending therethrough substantially concentric therewith. The condenser is joined at its lower end to the liquid refrigerant supply line 20 and operates on the counterflow principle, the refrigerant gas flowing through the same in one direction, while a cooling medium, preferably water, flows through the tube 19 in the opposite direction.

The evaporator of the refrigerating system consists of a plurality of horizontally disposed tubes 21 joined to a liquid header 22 and a suction header 23, respectively, and which are connected by other tubes and by return bends 24 to comprise a plurality of coils arranged in tiers, each coil connecting with the liquid header and with the suction header. The liquid header 22 is joined by conduit 25 with the expansion valve designated in its entirety by 26, while the suction header 23 is connected by the suction line 15 to a drum 28 forming the shell of a heat interchanger. The drum 28 is provided with end portions 29, preferably integral therewith, one end portion of the drum having one section of the suction line 15 fixed thereto, while the other end portion of the drum has the other section fixed thereto so that the complete suction line from compressor to header includes the drum 28. The liquid line 20 leading from the condenser 18 connects with nipple 30 which joins the line to a pair of spiral coils located within and extending longitudinally of the drum 28. The coils project from the opposite end of the drum and connect with a nipple 32 similar to nipple 30, which in turn is joined to the liquid supply line 20, the same comprising a continuation of the line leading from the condenser. Said liquid line connects by nipple 33 to the base of the thermostatic expansion valve 26.

The expansion valve is more particularly shown in Figure 2, the liquid refrigerant from line 20 being conducted through the passage 34 to passage 35, the end of which forms a valve seat for the valve 36 having contact with the member 37 extending through the passage. The liquid that is permitted to escape by valve 36 flows through passage 38 and is subsequently delivered to conduit 25, connecting with the liquid header 22. Member 37 contacts at its upper end with disk 40 which is in contact with the underside of the diaphragm 41, confined at its edges between the ring 42 and the cap portion 43. Said cap portion provides an apertured boss connecting with a capillary tube 44, said tube having communication with the chamber on the upper side of the diaphragm.

Within portion 45, suitably fixed to the casing of the valve, is a threaded stem 46 having its upper end projecting within a recess containing the coil spring 47. Said spring is confined between the valve 36 and said end of the stem and acts to maintain the valve against its seat. The position of the stem within the recess can be adjusted to vary the tension exerted on the valve. The tube 44 is joined to a thermostatic bulb 50, charged with a thermostatic liquid, which, upon vaporization creates a pressure acting against the diaphragm to open the valve. Communicating with the chamber on the underside of the diaphragm is a hole leading to the equalizer tube 48, having its other end connecting with the suction header 23. Through this tube the pressure of the suction header 23 is equalized with the pressure under the diaphragm 41 of the expansion valve 26.

In accordance with the invention, the thermostatic bulb 50 is located in contact with the shell 28 of the heat interchanger, being held to said shell by any suitable form of clamping means such as shown at 51. It will be observed that the bulb 50 is in direct contact with the exterior of the drum forming the heat interchanger so that the bulb is therefore readily influenced by the temperature changes taking place in the shell of said frame. It is preferred that the drum 28 being constructed of metal having a high thermal conductivity, as for example, copper, and that the shell be relatively thin to render the thermostatic bulb 50 more sensitive to the temperature changes occurring within the shell.

The cooled evaporated refrigerant gas from the suction header 23 is conducted to the drum 28 of the heat interchanger, the same flowing through said drum and being brought into heat exchanging relation with the liquid refrigerant flowing in a counter direction through the spiral coils 31. The coils materially increase the surface subjected to the influence of the cooled evaporated refrigerant and considerable heat is thus removed from the liquid refrigerant. As a result the liquid refrigerant is delivered to the expansion valve 26 and to the liquid header 22 at a much lower temperature than would otherwise be the case. In fact, the liquid refrigerant is cooled to very nearly evaporator temperature.

By locating the thermostatic bulb on the shell of the heat interchanger overfeeding and underfeeding of liquid refrigerant to the evaporator is entirely eliminated and the expansion valve operates to supply just the proper quantity of liquid refrigerant to the evaporator to produce the maximum cooling capacity for the particular conditions of operation. It has been found that the low temperature of the shell of the heat interchanger resulting from the evaporated refrigerant flowing through the drum is sufficient to cause actuation of the valve 36 in a direction to open, admitting liquid refrigerant to the liquid header as desired. In the event the demand on the evaporator should drop to a minimum, whereupon an excessive amount of evaporated refrigerant would be delivered to the suction line and thus to the heat interchanger, the temperature of the shell thereof will immediately react to this excess of cool evaporated refrigerant and will influence the thermostatic bulb 50 so that the expansion valve will be actuated to considerably reduce the supply of liquid refrigerant. Should the above conditions be reversed, which would occur by delivering to the evaporator an excess quantity of air at a high temperature, then the evaporated refrigerant entering the heat interchanger would be at a relatively high temperature and the shell thereof would begin to warm up rapidly, since the same is influenced by the heat given off from the spiral coils 31 carrying the liquid refrigerant. The rapid heating up of the shell of the heat interchanger will influence thermostatic bulb 50 and cause actuation of the expansion valve to again admit refrigerant to the liquid header. This more rapid rate of temperature change in the shell of the heat interchanger results in a more uniform flow of liquid to the evaporator, causing the same to operate at its maximum cooling capacity at all times.

The invention is not to be limited to or by details of construction of the particular embodiment thereof illustrated by the drawing, as various other forms of the device will of course be apparent to those skilled in the art without departing from the spirit of the invention or the scope of the claims.

What is claimed is:

1. A refrigerating system comprising, in combination, an evaporator, a return conduit for withdrawing the evaporated refrigerant gas from the evaporator, a supply conduit for supplying liquid refrigerant to the evaporator, a heat interchanger for removing the heat from the liquid refrigerant by bringing the same into heat exchanging relation with the evaporated refrigerant, an expansion valve in the supply conduit at the inlet to the evaporator, and thermostatic control means for the valve for regulating the quantity of liquid refrigerant supplied to the evaporator, said control means having contact with the shell of the heat interchanger whereby the control is responsive to the temperature of said shell.

2. A refrigerating system comprising, in combination, an evaporator, a return conduit for withdrawing the evaporated refrigerant from the evaporator, a supply conduit for supplying liquid refrigerant to the evaporator, a heat interchanger for removing the heat from the liquid refrigerant by bringing the same into heat exchanging relation with the evaporated refrigerant, an expansion valve in the supply conduit at the inlet to the evaporator, and control means for said valve including a thermostatic bulb for regulating the quantity of liquid refrigerant supplied to the evaporator, said thermostatic bulb having contact with the shell of the heat interchanger whereby the control is responsive to the temperature thereof.

3. In a refrigerating system, the combination of an evaporator, consisting of a header connecting with the inlet end of a plurality of evaporating coils for supplying liquid refrigerant to said coils, a suction line communicating with the discharge end of said evaporating coils for withdrawing the evaporated refrigerant gas therefrom, a heat interchanger in the suction line for precooling the liquid refrigerant prior to supplying the same to the header, and thermostatic means having contact with the heat interchanger for regulating the quantity of liquid refrigerant supplied to the header.

4. In a refrigerating system, the combination of an evaporator including a header connecting with the inlet end of a plurality of evaporating coils, a supply line leading to the header for supplying the same with liquid refrigerant, an expansion valve in said supply line, a suction line connecting with the discharge end of the evaporating coils for withdrawing the evaporated refrigerant gas therefrom, a heat interchanger in the suction line for precooling the liquid refrigerant prior to supplying the same to the expansion valve, and a thermostatic bulb forming control means for said expansion valve for regulating the quantity of liquid refrigerant supplied to the header, said thermostatic bulb having contact with the shell of the heat interchanger whereby the control is responsive to the temperature thereof.

5. A refrigerating system comprising, in combination, an evaporator, a return conduit for withdrawing cool evaporated refrigerant gas from the evaporator, a supply conduit for supplying liquid refrigerant to the evaporator, heat exchanging means positioning the supply conduit within the return conduit, whereby heat is extracted from the liquid refrigerant and the temperature of the evaporated refrigerant gas is raised, an expansion valve in the supply conduit at the inlet to the evaporator, and thermostatic control means for said valve having contact with the exterior of the heat exchanging means, said control being responsive to the temperature of said exterior which is influenced by the cool refrigerant gas and also by the heat in the liquid refrigerant.

6. A refrigerating system comprising, in combination, an evaporator, a return conduit for withdrawing cool evaporated refrigerant gas from the evaporator, a supply conduit for supplying liquid refrigerant to the evaporator, a heat exchanger including a drum located in the return conduit and a coil within the drum communicating with the supply conduit and conducting liquid refrigerant through the drum, whereby heat is extracted from the liquid refrigerant and the temperature of the evaporated refrigerant gas is raised, an expansion valve in the supply conduit at the inlet to the evaporator, and a thermostatic bulb having contact with the shell of the heat exchanger, said bulb providing control means for said valve responsive to the rapid temperature changes in the shell of said heat exchanger, whereby overfeeding and underfeeding of liquid refrigerant to the evaporator is eliminated.

7. A refrigerating system comprising, in combination, an evaporator, a return conduit for withdrawing cool evaporated refrigerant gas from the evaporator, a supply conduit for supplying liquid refrigerant to the evaporator, a heat exchanger including a drum having a thin copper shell and located in the return conduit, and a coil within the drum communicating with the supply conduit and conducting liquid refrigerant through the drum, whereby heat is extracted from the liquid refrigerant and the temperature of the evaporated refrigerant gas is raised, an expansion valve in the supply conduit at the inlet to the evaporator, and a thermostatic bulb having contact with the shell of said heat exchanger, said bulb providing control means for the valve responsive to the rapid temperature changes in the shell of said heat exchanger, whereby overfeeding and underfeeding of liquid refrigerant to the evaporator is eliminated.

RICHARD H. SWART.